United States Patent
Pegg et al.

(10) Patent No.: US 8,687,361 B2
(45) Date of Patent: Apr. 1, 2014

(54) CLAMSHELL PORTABLE ELECTRONIC DEVICE WITH INPUT DEVICE IN HINGE

(75) Inventors: Albert Murray Pegg, Cambridge (CA); Silvlu Tanase, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 264 days.

(21) Appl. No.: 13/046,262

(22) Filed: Mar. 11, 2011

(65) Prior Publication Data

US 2012/0229960 A1 Sep. 13, 2012

(51) Int. Cl.
*G06F 1/16* (2006.01)
*G06F 3/02* (2006.01)

(52) U.S. Cl.
USPC .............. 361/679.55; 361/679.56; 345/168; 345/169

(58) Field of Classification Search
USPC ............ 455/575.1, 575.3, 575.4, 90.3, 556.1, 455/556.2; 361/679.01–679.45, 361/679.55–679.59; 345/156, 157, 168, 345/169, 905; 379/428.01–433.13
See application file for complete search history.

(56) References Cited

U.S. PATENT DOCUMENTS

| | | | |
|---|---|---|---|
| 5,436,954 A * | 7/1995 | Nishiyama et al. | 455/566 |
| 6,011,544 A * | 1/2000 | Sato | 345/168 |
| 6,292,563 B1 * | 9/2001 | Clark et al. | 379/433.13 |
| 7,035,665 B2 * | 4/2006 | Kido et al. | 455/566 |
| 7,202,906 B2 | 4/2007 | Ijas et al. | |
| 7,352,357 B2 * | 4/2008 | Tachikawa et al. | 345/156 |
| 2002/0032010 A1 | 3/2002 | Okuda et al. | |
| 2002/0041483 A1 * | 4/2002 | Horii et al. | 361/683 |
| 2005/0099533 A1 | 5/2005 | Matsuda et al. | |
| 2009/0186662 A1 | 7/2009 | Rak et al. | |
| 2009/0244832 A1 * | 10/2009 | Behar et al. | 361/679.55 |

FOREIGN PATENT DOCUMENTS

WO WO 00/69149 11/2000

OTHER PUBLICATIONS

Extended European Search Report for European Patent Application Serial No. 11157914, Europe, Aug. 11, 2011.
http://mobilementalism.com/2008/10/01/four-japanese-concept-phones-from-kddi/, accessed from Wayback machine dated Jan. 2010.

* cited by examiner

Primary Examiner — Jayprakash N Gandhi
Assistant Examiner — Nidhi Desai
(74) Attorney, Agent, or Firm — Bereskin & Parr LLP

(57) ABSTRACT

A portable electronic device, including a first portion, a second portion hingedly coupled to the first portion so that the first and second portions are movable between an open position and a closed position, and a hinge member coupled to the first portion and second portion adjacent the hinged end of the first and second portions. The hinge member includes at least one input device therein.

8 Claims, 11 Drawing Sheets

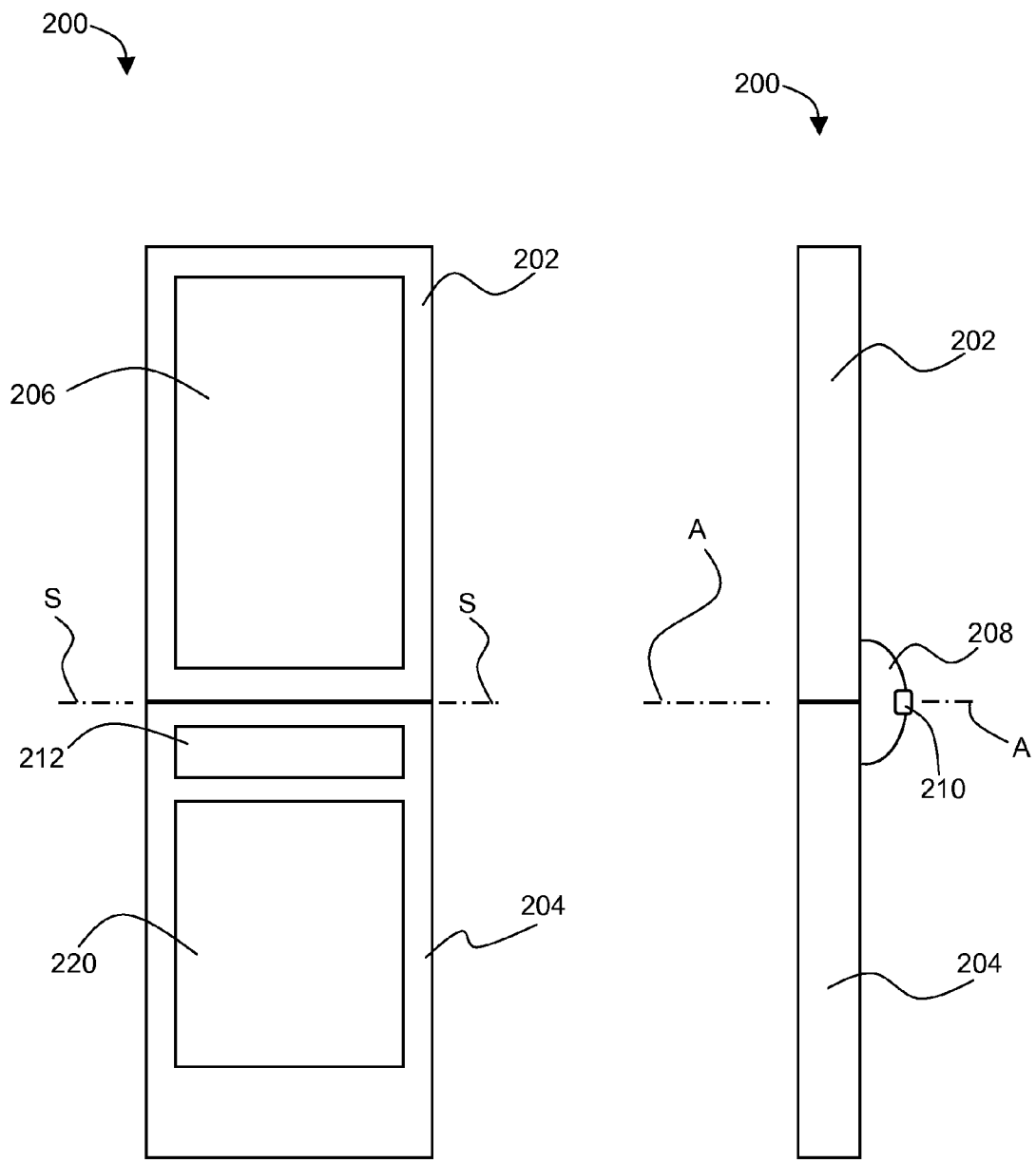
FIG. 2  FIG. 3

US 8,687,361 B2

CLAMSHELL PORTABLE ELECTRONIC DEVICE WITH INPUT DEVICE IN HINGE

FIELD

Embodiments herein relate to portable electronic devices, and more particularly to a clamshell or flip portable electronic device having a hinge member.

INTRODUCTION

Electronic devices, including portable electronic devices, have gained widespread use and may provide a variety of functions including, for example, telephonic, electronic text messaging and other personal information manager (PIM) application functions. Portable electronic devices can include mobile stations such as cellular phones, smart phones, Personal Digital Assistants (PDAs), tablets and laptop computers.

Some portable electronic devices are clamshell devices, also known as foldable or flip devices, which include two body portions that are foldable along a hinge. Clamshell devices are generally foldable between an open position, wherein the body portions are extended apart (which may expose a display screen, a keypad, etc.), and a closed position wherein the two body portions are adjacent or folded together, which may hide the keypad or display screen for example.

BRIEF DESCRIPTION OF THE DRAWINGS

Embodiments of the present disclosure will now be described, by way of example only, with reference to the attached figures, wherein:

FIG. 2 is a schematic front view of a portable electronic device according to one embodiment shown in an open position;

FIG. 3 is a schematic side view of the portable electronic device of FIG. 2 shown in the open position;

DETAILED DESCRIPTION

Figure 1:
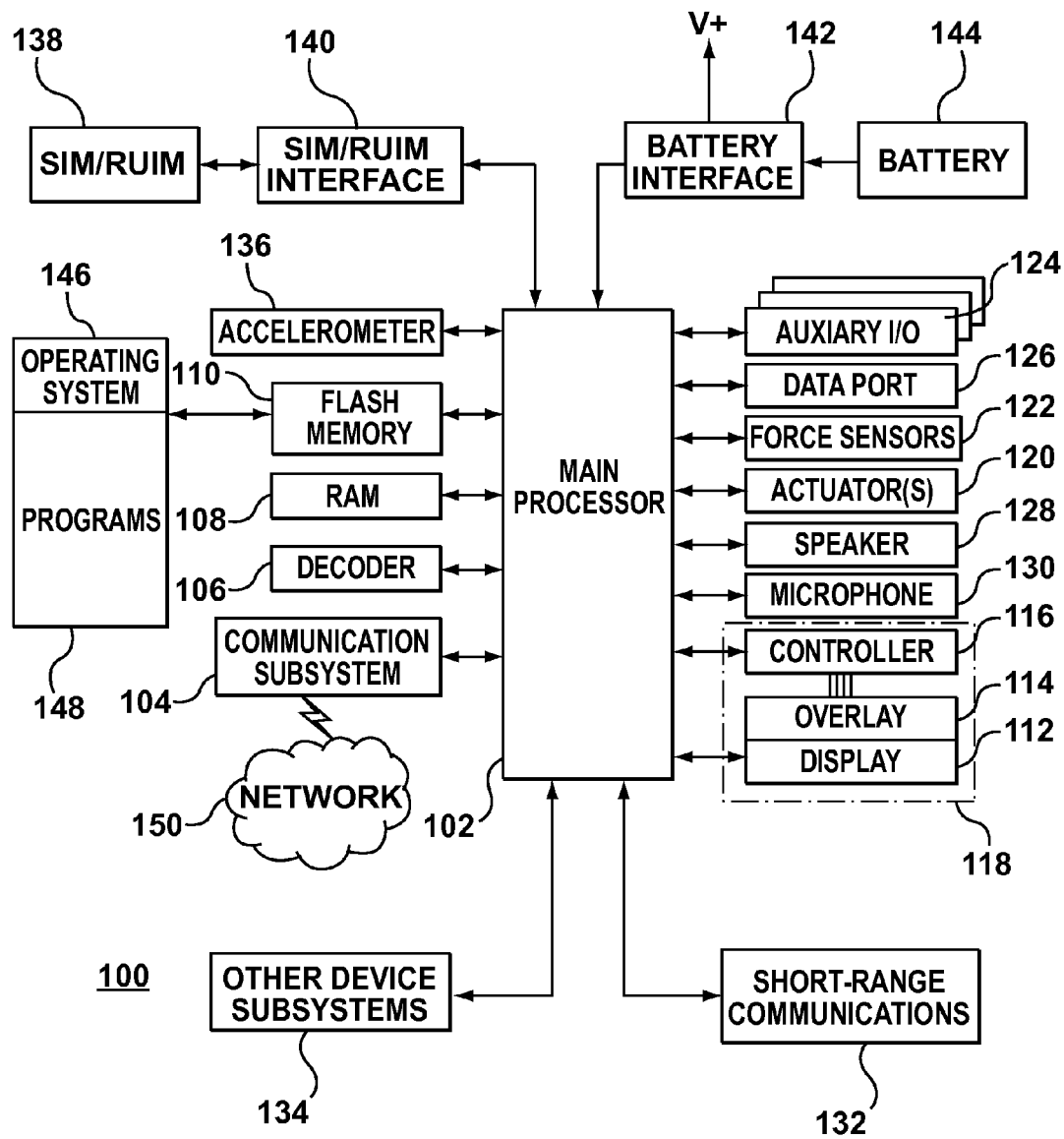
FIG. 1 is a simplified block diagram of components of a portable electronic device.

Described herein in some embodiments are portable electronic devices that may include a display disposed on a first portion, a keypad disposed on a second portion, and functional components such as a memory and a processor. The first and second portions are hingedly coupled so as to be foldable between an open position and a closed position. The portable electronic devices also include at least one input device provided in at least one hinge member coupled to the first and second portions.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components of a portable electronic device 100. The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The portable electronic device 100 may be a battery-powered device and as shown includes a battery interface 142 for receiving one or more rechargeable batteries 144.

The processor 102 also interacts with additional subsystems such as a Random Access Memory (RAM) 108, a flash memory 110, a display 112 (e.g. with a touch-sensitive overlay 114 connected to an electronic controller 116 that together comprise a touch-sensitive display 118), an actuator assembly 120, one or more optional force sensors 122, an auxiliary input/output (I/O) subsystem 124, a data port 126, a speaker 128, a microphone 130, short-range communications systems 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device generated by the processor 102 may be displayed on the touch-sensitive display 118.

The processor 102 may also interact with an accelerometer 136 as shown in FIG. 1. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150). Alternatively, user identification information may be programmed into the flash memory 110 or performed using other techniques.

The portable electronic device 100 also includes an operating system 146 and software components 148 that are executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, web page download, or other data may be processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 may output audible information converted from electrical signals, and the microphone 130 may convert audible information into electrical signals for processing.

Turning now to FIGS. 2 to 6, illustrated therein is a portable electronic device 200 according to one embodiment. The portable electronic device 200 is a "clamshell" or "flip" device and generally includes a first portion (shown here as a display portion 202), and a second portion (shown here as a keypad portion 204). The display portion 202 and keypad portion 204 are coupled to a hinge member 208 generally provided adjacent corresponding hinged ends of the keypad portion 204 and display portion 202.

Figure 4:
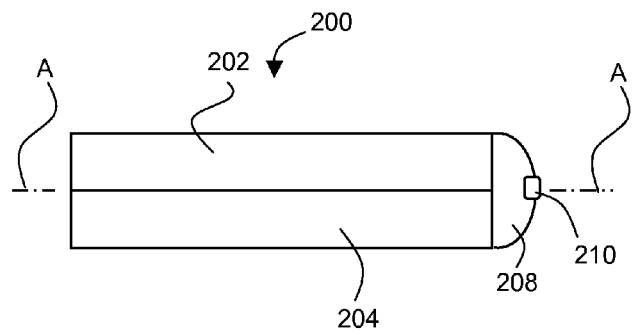
FIG. 4 is a schematic side view of the portable electronic device of FIG. 2 shown in the closed position.
Figure 5:
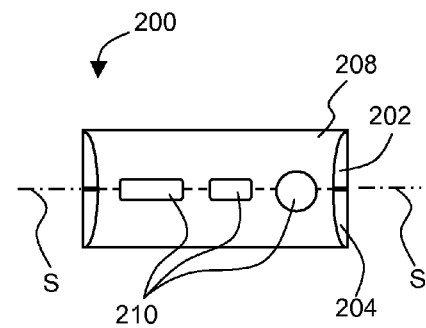
FIG. 5 is a schematic back view of the portable electronic device of FIG. 2 shown in the closed position.
Figure 6:
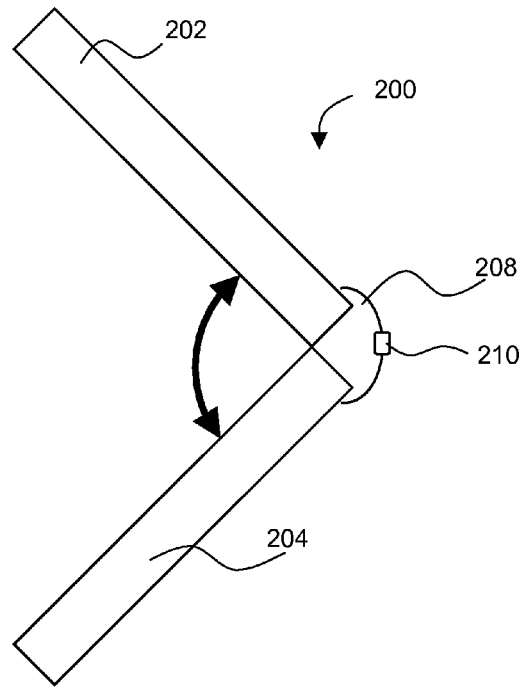
FIG. 6 is a schematic side view of the portable electronic device of FIG. 2 shown in an intermediate position between the open position and the closed position.
Figure 7:
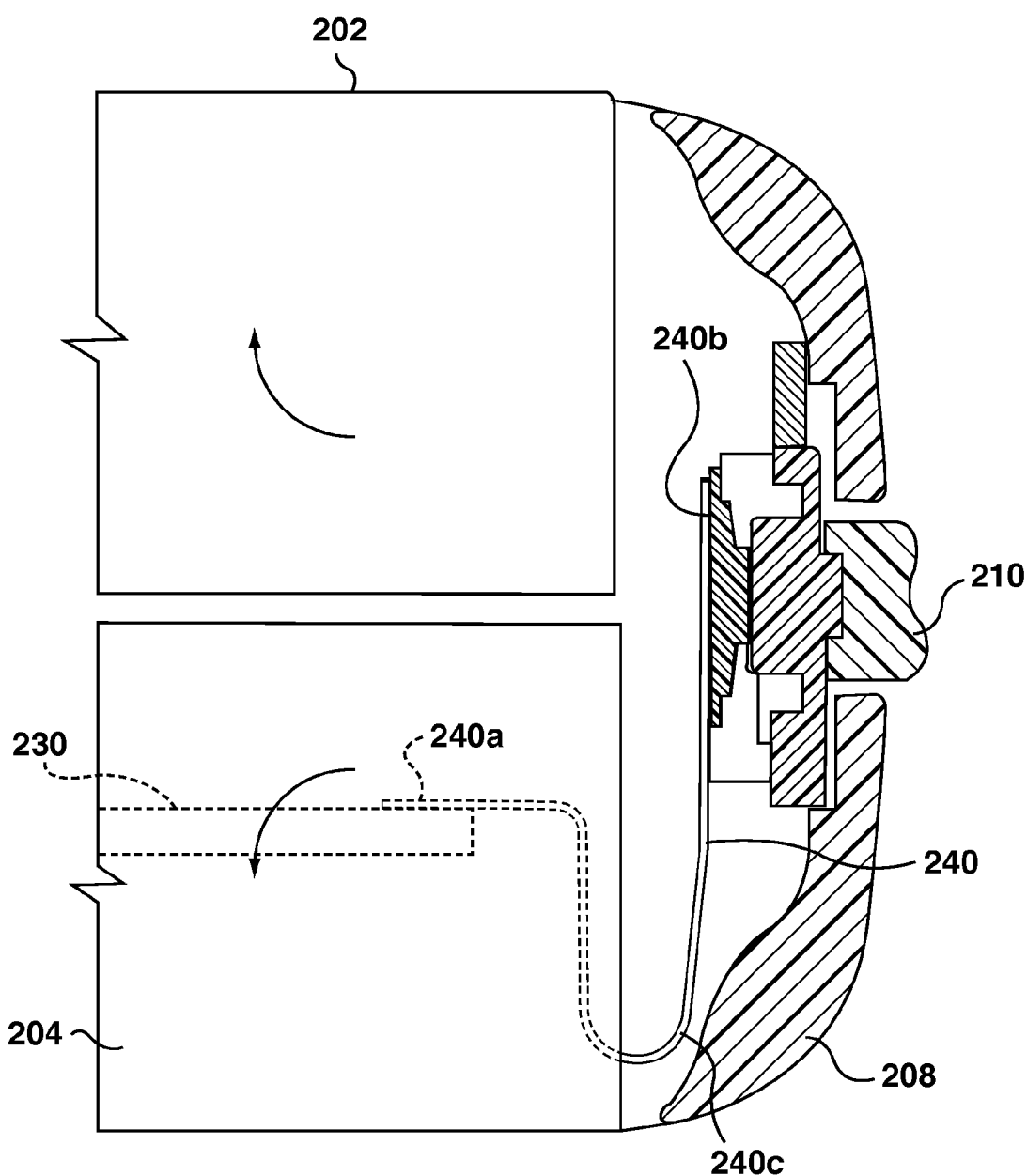
FIG. 7 is a detailed side cross-sectional view of a hinge member of the portable electronic device of FIG. 2 shown in the closed position.
Figure 8:
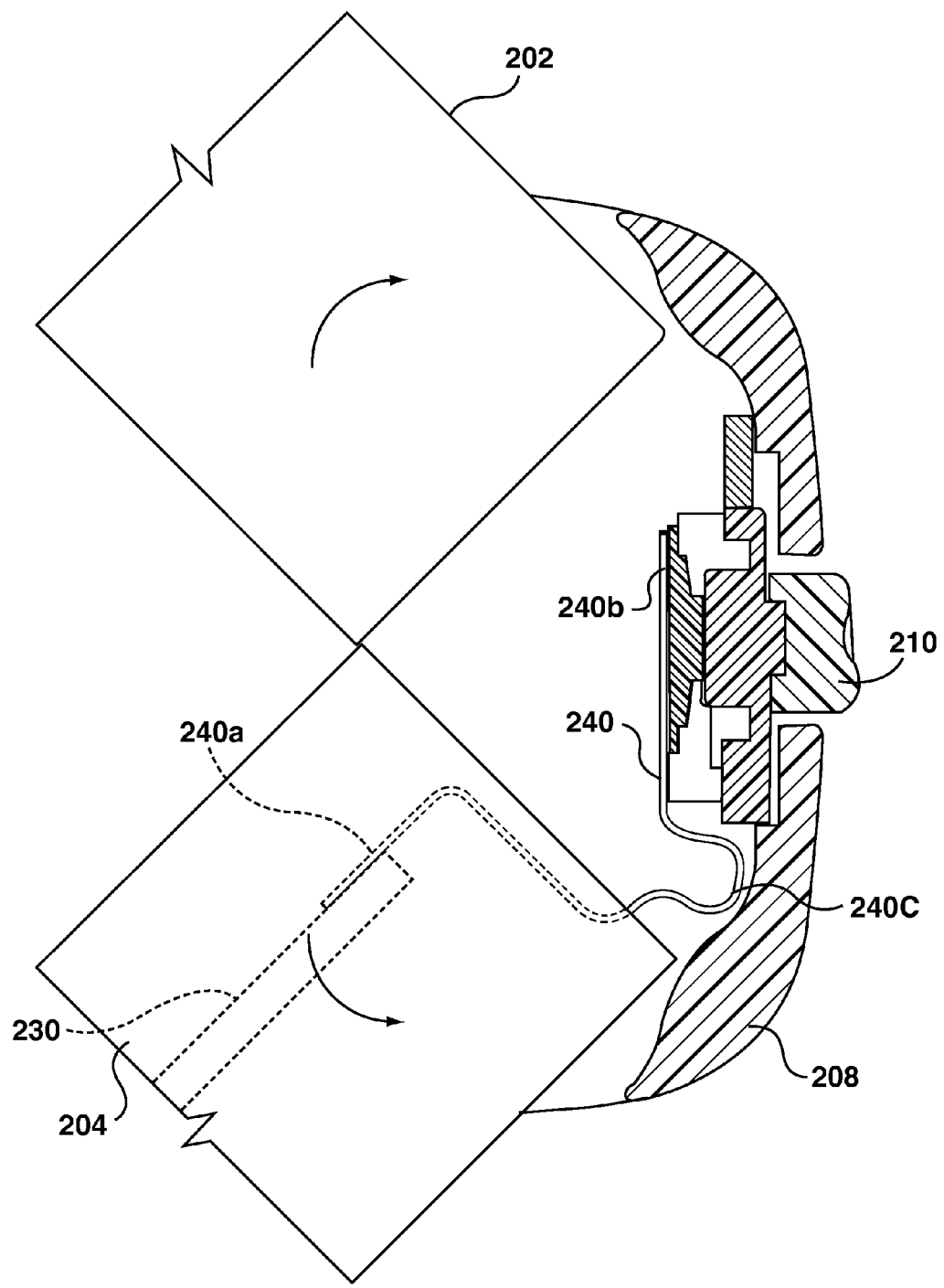
FIG. 8 is a side cross-sectional view of the hinge member of FIG. 7 shown in the intermediate position.
Figure 9:
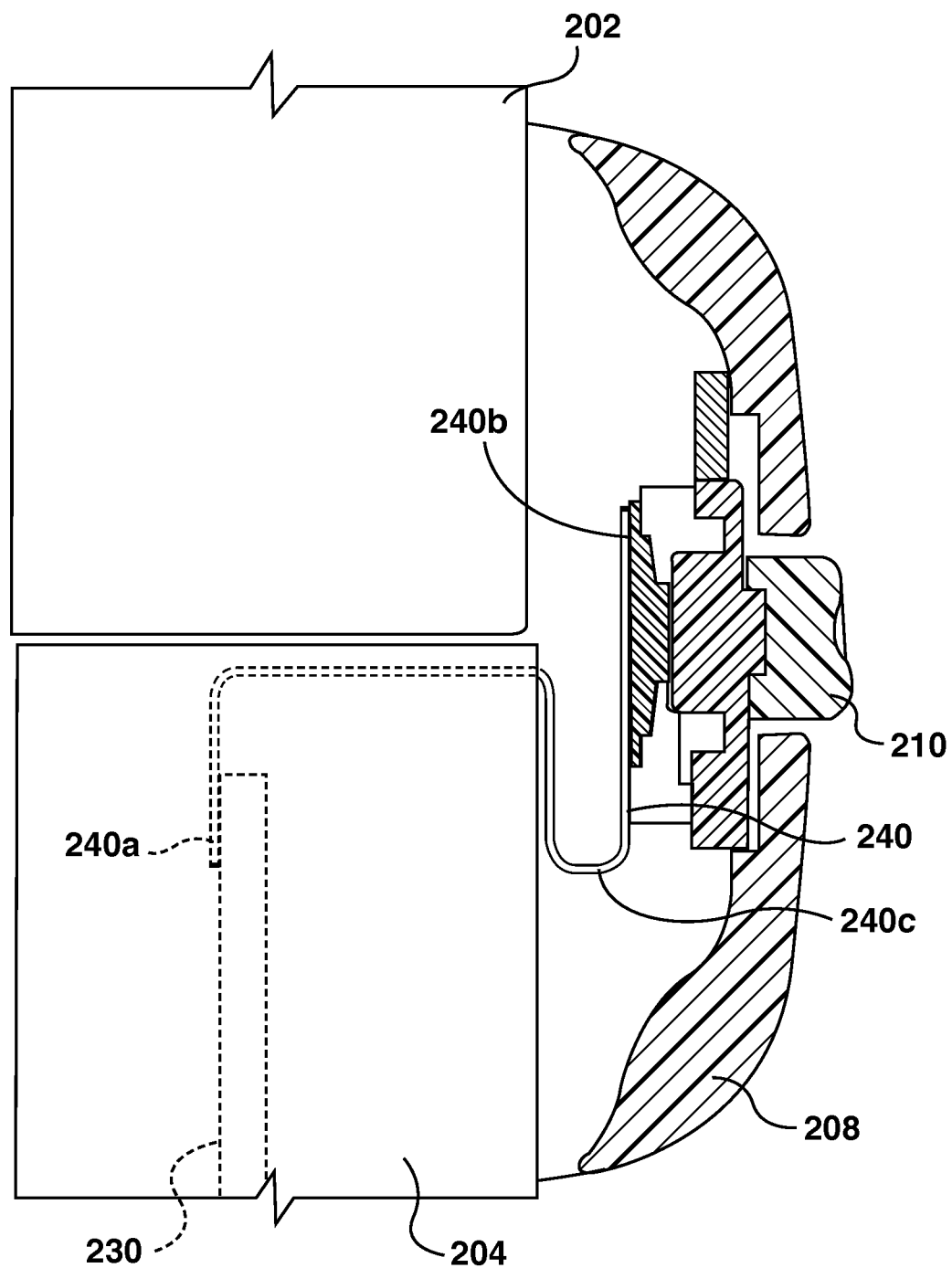
FIG. 9 is a side cross-sectional view of the hinge member of FIG. 7 shown in the open position.

The display portion 202, keypad portion 204, and hinge member 208 cooperate so that the device can be folded between an open position (as shown in FIGS. 2 and 3) to a closed position (as shown in FIGS. 4 and 5), generally while passing through an intermediate position between the open and closed positions (as shown in FIG. 6).

In some embodiments, the display portion 202 and keypad portion 204 may be hingedly coupled to each other (e.g. via a hinge mechanism), and the hinge member 208 may serve as a cover of the hinge mechanism. In other embodiments, the hinge member 208 may serve as the hinge mechanism and be hingedly coupled to the display portion 202 and keypad portion 204.

As shown, in this embodiment the display portion 202 includes a display 206, while the keypad portion 202 includes a keypad 220 and other input devices 212 (e.g. a trackpad, other input buttons, etc.).

The portable electronic device 200 also includes at least one input device 210 that is provided in the hinge member 208. For example, as shown in FIGS. 3 and 4, the at least one input device 210 may be provided on the hinge member 208 and aligned with a first axis A, which is generally defined as being an axis generally aligned with a line of contact between the display portion 202 and keypad portion 204 when in the closed position. Furthermore, as shown in FIG. 5, the at least one input device 210 may be aligned with a second axis S of the device 200, which is an axis generally aligned with a "hinge axis" about which the display portion 202 and keypad portion 204 are hingedly coupled or pivot.

Generally, the at least one input device 210 could include any suitable button or other control device for controlling one or more functions on the device 200, such as an optical joystick (e.g. a trackpad), a navigation button, volume keys, soft keys, and so on.

The input device 210 on the hinge member 208 may be used as an alternative to input devices that have previously been placed along the side edges of a portable electronic device. For example, some prior electronic devices included function buttons along the side edges of a keypad portion of the device to control aspects such as volume or for navigation. These could be used in addition to interacting with a touch screen display or a keypad. However, while functionally useful, such buttons protruded outwardly from the side of the device, which tended to interfere with a "clean" aesthetic look for the device. Furthermore, such buttons could be subject to unintentional button presses when a user was holding the keypad portion of a device, as the user's fingers or palm tended to be in proximity to the input buttons.

Accordingly, embodiments as described herein that provide input devices 210 on the hinge member 208 may provide for a cleaner aesthetic look of the device 200, particularly since the input devices 210 may be hidden on the back of the device 200 (e.g. opposite the display 206 and keypad 220) when the device 200 is open, thus eliminating or at least reducing the need for keys along the side edges of the device as one or more of the keys can be replaced by the input devices 210. In particular, providing one or more input devices 210 on the hinge member may reduce the number of breaks in the side decorative surfaces of the device 200, such as the housing of the display portion 202 and keypad portions 204.

Furthermore, providing the input devices 210 on the hinge member 208 may still allow the input devices 210 to be used when the device 200 is closed. For example, activating one of the input devices 210 could be used to answer an incoming call using a speakerphone, or send an incoming call directly to voicemail.

Additionally, placing the input devices 210 on the hinge member 208 generally aligned with the first axis A and second axis S may tend to avoid at least some unintentional button presses.

However, one challenge in providing input devices 210 in the hinge member 208 is accommodating the relative movement between the display portion 202, the keypad portion 204 and the hinge member 208 as the device 200 opens and closes. In particular, signals generated by pressing or otherwise engaging the at least one input device 210 must be received by one or more functional components of the device 200 (e.g. the processor 102) so that the corresponding action (e.g. increasing or decreasing volume, answering a phone call, etc.) can be executed. Accordingly, various techniques may be used for electrically coupling the input devices 210 to the functional components of the device 200.

One embodiment shown in FIGS. 7 to 10 uses a flex connector 240 (also known as a flex cable) to electrically connect the at least one input device 210 to a functional component, such as a printed circuit board (PCB) 230 in the keypad portion 202. As shown, the flex connector 240 includes a first end 240a coupled to the PCB 230, a second end 240b coupled to the at least one input device 210, and a dynamic region 240*c* generally between the ends 240*a*, 240*b* of the flex connector 240.

As the device 200 moves between the closed position (shown in FIG. 7) the intermediate position (shown in FIG. 8) and the open position (shown in FIG. 9), the flex connector 240 maintains the electrical connection between the input device 210 and the PCB 230. In particular, the dynamic portion 240*c* of the flex connector 240 can move and change shape as the display portion 202 and keypad portion 204 are moved. This allows the flex connector 240 to follow changes in the orientation of the PCB 230 with respect to the hinge member 208 in order to maintain the electrical connection between the input device 210 and the PCB 230.

This embodiment may be particularly useful when it is desirable that the input device(s) 210 remain active regardless of the position of the device 200 (e.g. whether the device is in the open position, the closed position, or an intermediate position).

In other embodiments, it may be desirable that the input device is deactivated when the device is in one of certain positions. This may be helpful to inhibit undesired button presses, such as when the device is resting on a table or being handled by a user in the open position.

In some embodiments, controlling whether a particular input device is active in a particular device position may be accomplished by using software. For instance, sensors may detect the device position and then a software module may selectively deactivate particular input devices, for example based on user preferences. However, other techniques can also be used to selectively activate and deactivate particular input devices depending on the device position.

Figure 10:
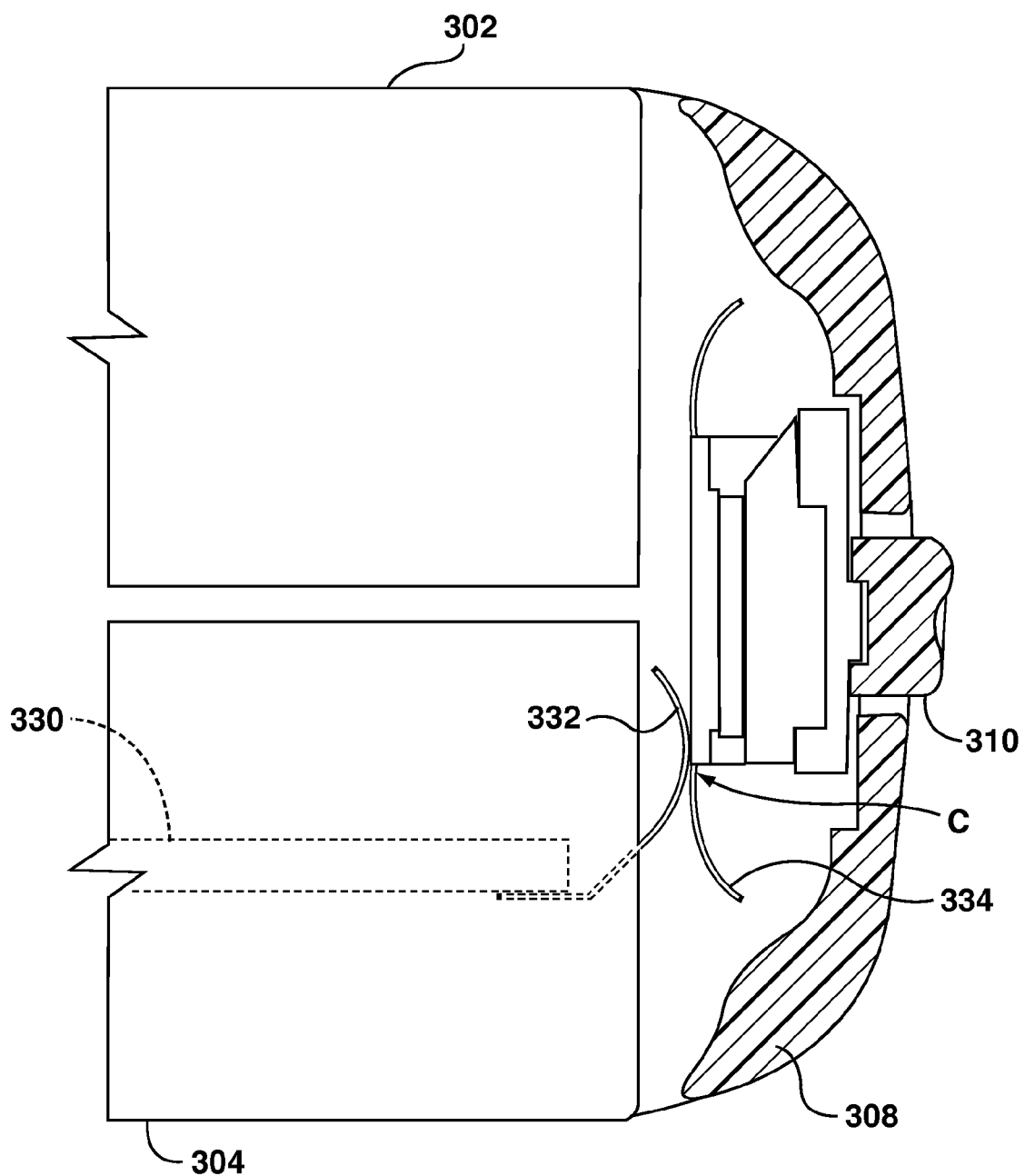
FIG. 10 is a side cross-sectional view of a hinge member of a portable electronic device shown in a closed position according to another embodiment.
Figure 11:
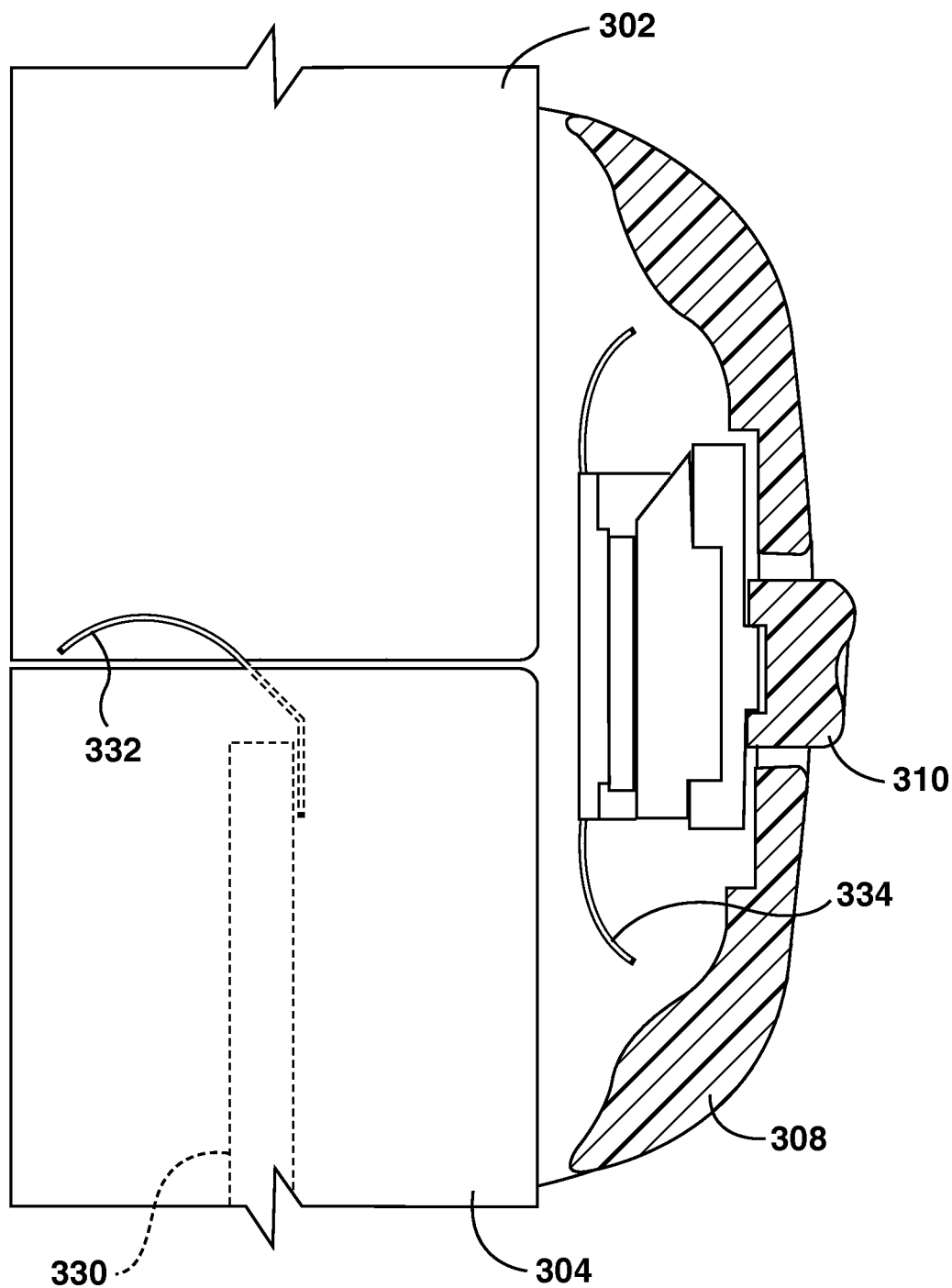
FIG. 11 is a side cross-sectional view of the hinge member of FIG. 10 shown in an open position.

One such embodiment is shown in FIGS. 10 and 11. For example, in this embodiment a display portion 302 and keypad portion 304 are hingedly coupled via a hinge member 308, which supports at least one input device 310. In this embodiment, at least one flexible contact member is used to selectively couple the input device 310 to a PCB 330.

For example, as shown a first flexible contact member 332 is electrically coupled to the PCB 330, and another flexible contact member 334 is electrically coupled to the assembly of the input devices 310. The flexible contact members 332, 334 are positioned so that when the keypad and display portions 304, 302 are closed (as shown in FIG. 10), the flexible contact members 332, 334 are in physical contact with each other (indicated generally as C) so as to provide an electrical connection therebetween. Accordingly, the input device 310 will be active and in electrical communication with the PCB 330. However, the flexible contact members 332, 334 are positioned so that when the keypad and display portions 304, 302 are in the open position (as shown in FIG. 11), the flexible contact members 332, 334 disengage (e.g. are no longer in contact), and accordingly the input device 310 is deactivated and will not communicate with the PCB 330.

The flexible contact members 332, 334 may be made of an electrically conductive material, such as copper, aluminum, for example. Furthermore, the flexible contact members 332, 334 may be resilient so that they can flex and respond with a biasing force when engaging each other. In particular, the flexible contact members 332, 334 may be physically biased towards each other when in contact so as to help maintain good electrical contact therebetween (which may inhibit electrical arcing, for example).

Accordingly, in this embodiment, the input device 310 is active when the device in a first position (e.g. closed) and inactive when the device is in another position (e.g. open). This may be desirable as the user may not want to use the input device 310 when the keypad portion 304 and display 302 are open. For example, when the device is open the hinge member 308 will be at the back of the device and will normally be hidden from view when the user is looking at the display 206 and using the keypad 220. In such an orientation, a user may unintentionally engage the input device 310, for example while using their hands to grab the device 200 or by placing the device 200 on a surface. Accordingly, deactivating the input device 310 in this fashion may further help inhibit undesired button presses, for example.

In other embodiments, the flexible contact members 332, 334 may be configured so that the at least one input device 310 is active when the device is in the open position and inactive when the device is in the closed position.

Figure 12:
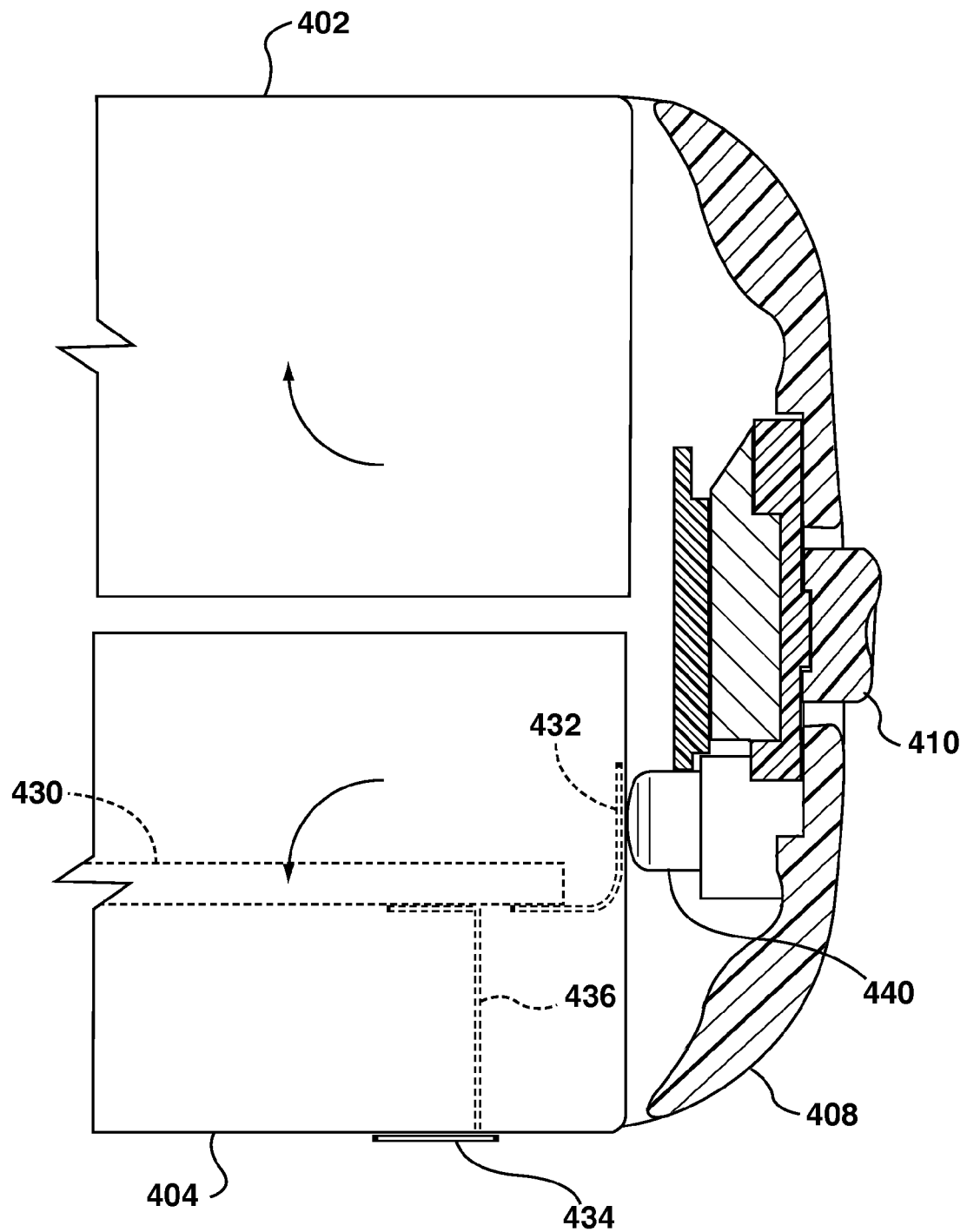
FIG. 12 is a side cross-sectional view of a hinge member of a portable electronic device shown in a closed position according to yet another embodiment.
Figure 13:
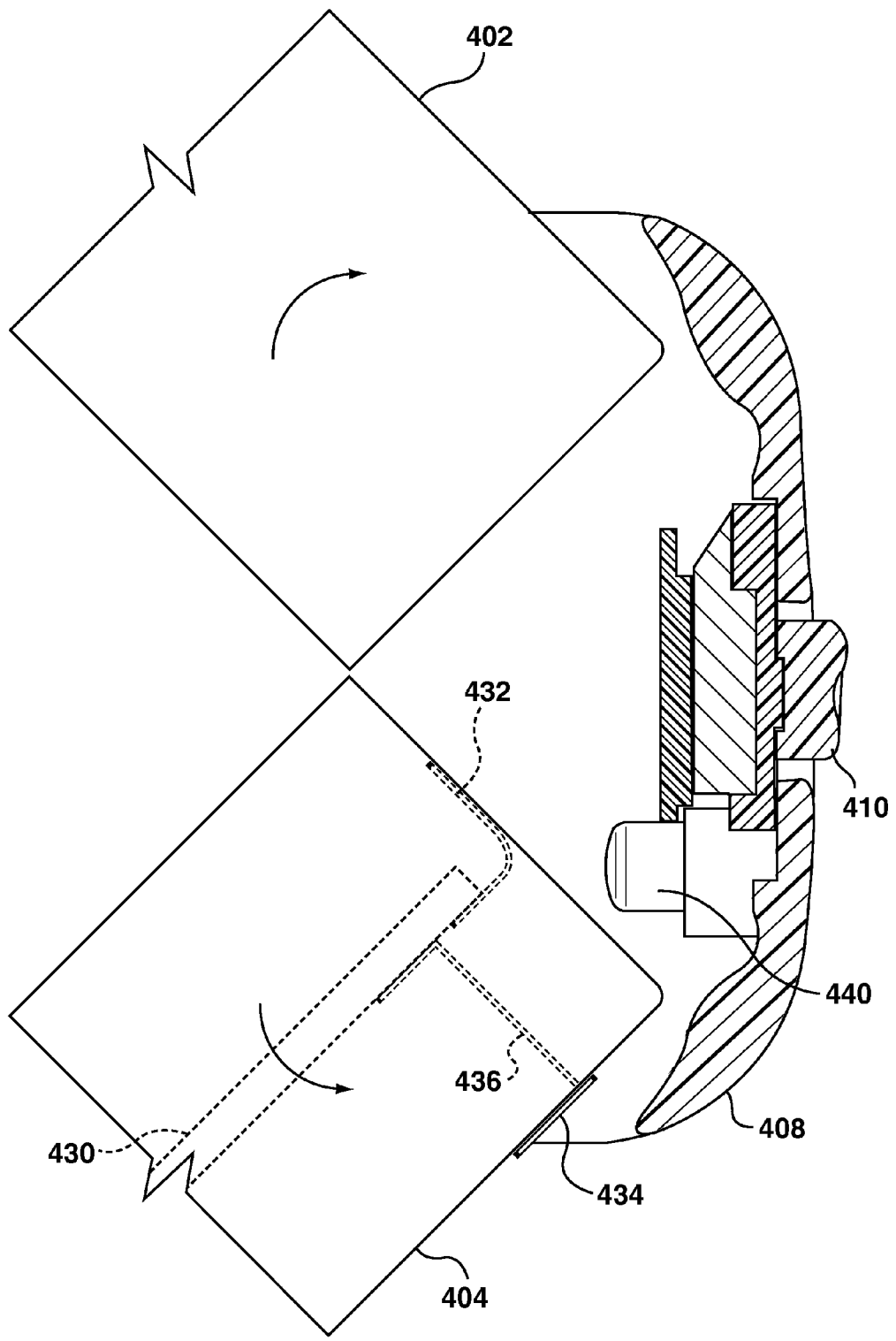
FIG. 13 is a side cross-sectional view of the hinge member of FIG. 12 shown in an intermediate position between an open position and the closed position.
Figure 14:
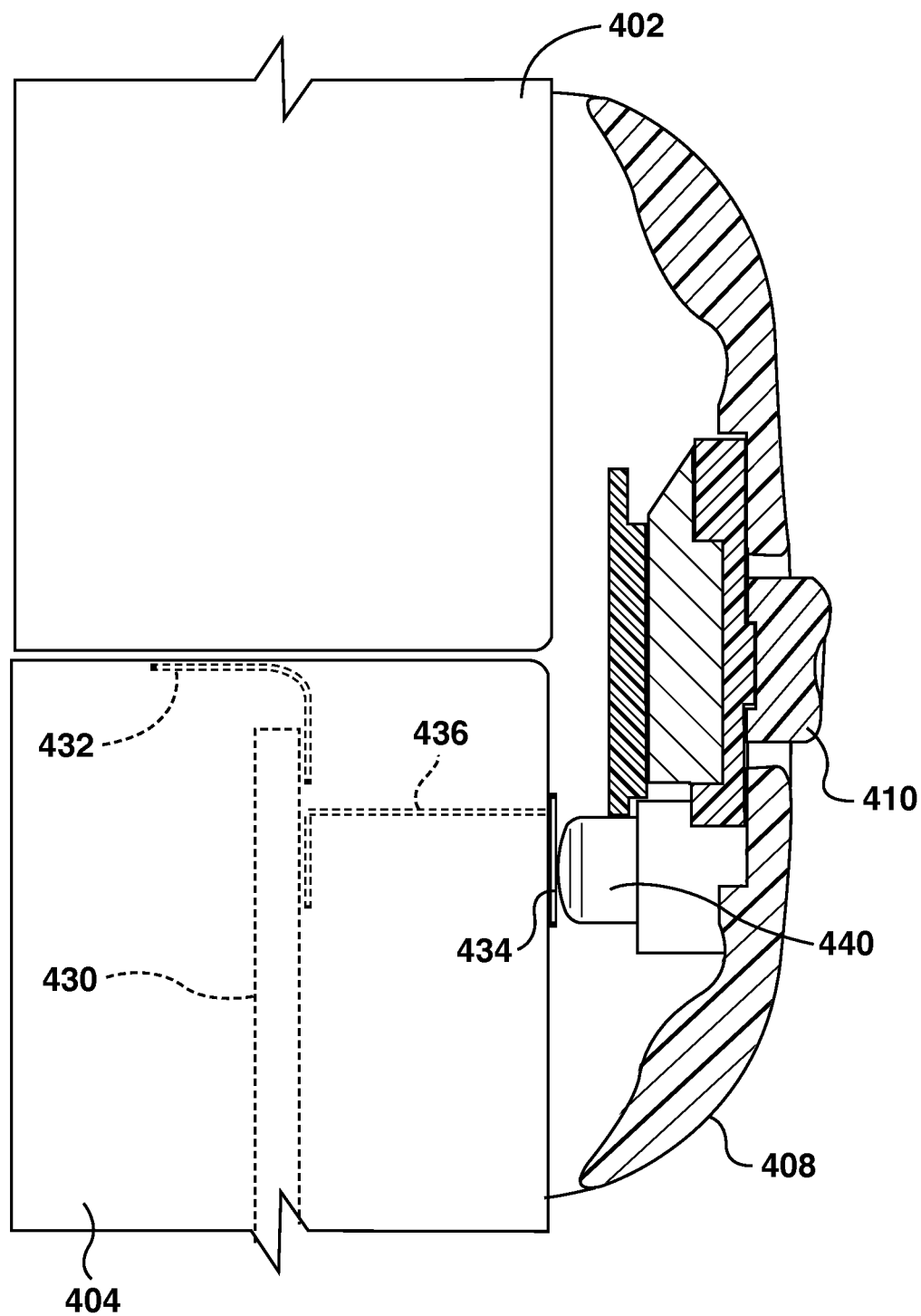
FIG. 14 is a side cross-sectional view of the hinge member of FIG. 12 shown in the open position.

Another embodiment is shown in FIGS. 12 to 14. In this embodiment, similar to as described above, a display portion 402 and keypad portion 404 are hingedly coupled via a hinge member 408, which supports at least one input device 410. The display portion 402 and keypad portion 404 are movable between a closed position (shown in FIG. 12) and an open position (shown in FIG. 14), while passing through an intermediate position (as shown in FIG. 13).

In this embodiment, at least one mechanical switch 440 is used to selectively couple the input device 410 to a PCB 430. In particular, in this embodiment a pin switch, also known as a "pogo" switch may used to electrically couple the input device 410 and PCB 430 together.

As shown in FIG. 12, a first pad member 432 is electrically coupled to the PCB 430 and positioned so that, when the display portion 402 and keypad portion 404 are closed, the pad member 432 depresses the switch 440 and forms an electrical connection therewith. According, the input device 410 is active when the device is in the closed position.

As the display portion 402 and keypad portion 404 are moved into the intermediate position (as shown in FIG. 13), the first pad member 432 disengages from the switch 440, breaking the electrical contact and deactivating the input device 410.

Then, when the display portion 402 and keypad portion 404 are moved into the open position (as shown in FIG. 14), a second pad member 434 engages with the switch 440 and restores the electrical connection. As shown, the second pad member 434 may be electrically coupled to the PCB 430 via an electrical conduit 436, which could for example be a flex cable or a rigid connector.

The pads 432, 434 are generally made of an electrically conductive material, such as copper.

As shown, the second pad member 434 is exposed on an outer surface of the keypad member 404 when the device is in the closed position, but is hidden behind the hinge member 408 when the device is in the open position.

In this embodiment, the switch 440 may include an internal biasing member (e.g. a spring) that biases the switch 440 towards the pads 432, 434 so as to ensure a good electrical contact between the switch 440 and the pad members 432, 434. In some embodiments, the switch 440 may be a pogo switch with a spring member located therein.

In this embodiment, the input device 410 is active in the open position and closed position, but is inactive in intermediate positions generally between the open and closed positions. This may be beneficial to avoid undesired activations of the input device 410 when opening or closing the device.

In some embodiments, when the device 200 is in the closed position components such as the display 206 and keypad 220 are covered by the keypad portion 204 and display portion 202. This may protect those components from damage, such as scratches or nicks that could result from carrying the device 200 in a user's pocket or purse, for example.

In some embodiments, the display 206 could be an LCD display with touch screen capabilities. For example, the display 206 could be the display 118 as generally described above. In other embodiments, the display 206 may not be a touch screen display.

The portable electronic device 200 may also include other input apparatus, such as navigation keys or buttons, a physical or virtual keyboard, a trackpad, a trackball, multimedia keys, etc. For example, in this embodiment the keypad portion 204 includes one or more input devices 212, which could include an optical navigation module (e.g. a trackpad), buttons, such as a phone application button, a home screen button, etc. In various embodiments, these input devices 212 may include optical sensors, mechanical buttons, "soft keys", or various combinations thereof.

As shown, the keypad portion 204 in this embodiment also includes the keypad 220. The keypad 220 may include a plurality of alphanumeric keys for inputting data into and otherwise controlling the portable electronic device 200. In some embodiments, the keys may represent an alphabet and may be arranged with a standard keyboard layout (e.g. QWERTY, QWERTZ, DVORAK, etc.) or according to other particular patterns. In some embodiments, the keypad 220 could be a physical keypad 220 with mechanical keys. In other embodiments, the keypad 220 could be a touch screen with soft keys.

While reference has been made herein to portable electronic devices wherein a first portion is a display portion and a second portion is a keypad portion, this is not meant to be limiting and other configurations are possible. For example, the first portion and second portion may both be touchscreen portions with no keypad. In other examples, the first portion may have a keypad and the second portion may include a display.

While the above description provides examples of one or more processes or apparatuses, it will be appreciated that other processes or apparatuses may be within the scope of the accompanying claims.

The invention claimed is:

1. A portable electronic device, comprising: a first portion; a second portion hingedly coupled to the first portion so that the first and second portions are movable between an open position, and a closed position in which the first portion and the second portion are overlapping and adjacent to each other; and a hinge member coupled to the first portion and the second portion adjacent a hinged end of each of the first and second portions, the hinge member having an input device, wherein the input device is active when the device is in the closed position and inactive when the device is in the open position; and a first flexible contact member electrically coupled to a functional component and a second flexible contact member electrically coupled to the input device, each of the first and second flexible contact members extending from a first end to a second end, respectively, and having a convex outer surface between the first and second ends, the first and second flexible contact members adapted to be: in physical contact with each other along the convex outer surfaces between the first and second ends to electrically connect the input device to the functional component and thereby activate the input device in the closed position, the first and second flexible contact members being resilient and configured to flex and respond with a biasing force to maintain electrical contact between the input device and the functional component in the closed position; and disengaged from each other to deactivate the input device in the open position.

2. The portable electronic device of claim 1, wherein the input device is aligned with a first axis aligned with a line of contact between the first portion and second portion when the first and second portions are in the closed position.

3. The portable electronic device of claim 1, wherein the input device is aligned with a second axis aligned with the axis about which the first portion and second portion are hingedly coupled.

4. The portable electronic device of claim 1, wherein the first portion is a display portion and includes a display.

5. The portable electronic device of claim 1, wherein the second portion is a keypad portion and includes a keypad.

6. The portable electronic device of claim 1, wherein the first and second flexible contact members have arc shaped portions that define the convex outer surfaces.

7. A portable electronic device, comprising: a first portion; a second portion hingedly coupled to the first portion so that the first and second portions are movable between a first position and a second position; a hinge member coupled to the first portion and the second portion adjacent a hinged end of each of the first and second portions, the hinge member having an input device; and a first flexible contact member electrically coupled to a functional component and a second flexible contact member electrically coupled to the input device, each of the first and second flexible contact members extending from a first end to a second end and having a convex outer surface between the first and second ends, the first and second flexible contact members adapted to be: in physical contact with each other along the convex outer surfaces between the first and second ends to electrically connect the input device to the functional component and thereby activate the input device in the first position, the first and second flexible contact members being resilient and configured to flex and respond with a biasing force to maintain electrical contact between the input device and the functional component in the first position, and disengaged from each other to deactivate the input device in the second position; wherein the first position is the closed position in which the first portion and the second portion are overlapping and adjacent to each other and the second position is the open position.

8. The portable electronic device of claim 7, wherein the first and second flexible contact members have arc shaped portions that define the convex outer surfaces.

* * * * *